United States Patent  (10) Patent No.: US 9,103,904 B2
Liao et al.  (45) Date of Patent: Aug. 11, 2015

(54) INTERFEROMETRIC MILLIMETER WAVE AND THZ WAVE DOPPLER RADAR

(71) Applicant: UChicago Argonne LLC, Chicago, IL (US)

(72) Inventors: Shaolin Liao, Willowbrook, IL (US); Nachappa Gopalsami, Naperville, IL (US); Sasan Bakhtiari, Darien, IL (US); Apostolos C. Raptis, Downers Grove, IL (US); Thomas Elmer, Westmont, IL (US)

(73) Assignee: UChicago Argonne, LLC, Chicago, IL (US)

( * ) Notice: Subject to any disclaimer, the term of this patent is extended or adjusted under 35 U.S.C. 154(b) by 157 days.

(21) Appl. No.: 13/873,898

(22) Filed: Apr. 30, 2013

(65) Prior Publication Data

US 2014/0320864 A1  Oct. 30, 2014

(51) Int. Cl.
  *G01B 9/02* (2006.01)
  *G01S 17/00* (2006.01)

(52) U.S. Cl.
  CPC ..................................... *G01S 17/00* (2013.01)

(58) Field of Classification Search
  CPC .......... G01B 9/02; G01H 9/00; G03F 7/0775; G01S 17/32; G01S 17/58
  USPC ....................................................... 356/486
  See application file for complete search history.

(56) References Cited

U.S. PATENT DOCUMENTS

| 7,495,218 | B2 | 2/2009 | Gopalsami et al. | |
| 7,888,645 | B2 | 2/2011 | Gopalsami et al. | |
| 2004/0021922 | A1* | 2/2004 | Chen et al. | 359/212 |
| 2008/0097194 | A1* | 4/2008 | Milner | 600/425 |
| 2009/0065696 | A1 | 3/2009 | Mann et al. | |
| 2009/0066948 | A1* | 3/2009 | Karpowicz et al. | 356/326 |
| 2010/0231909 | A1* | 9/2010 | Trainer | 356/336 |
| 2010/0290063 | A1 | 11/2010 | Bakhtiari et al. | |
| 2013/0104661 | A1* | 5/2013 | Klotz et al. | 73/657 |

FOREIGN PATENT DOCUMENTS

EP  0 807 830 A1  11/1997
EP  1 835 304 A2   9/2007

* cited by examiner

*Primary Examiner* — Tarifur Chowdhury
*Assistant Examiner* — Md Rahman
(74) *Attorney, Agent, or Firm* — Foley & Lardner LLP (57) ABSTRACT

A mixerless high frequency interferometric Doppler radar system and methods has been invented, numerically validated and experimentally tested. A continuous wave source, phase modulator (e.g., a continuously oscillating reference mirror) and intensity detector are utilized. The intensity detector measures the intensity of the combined reflected Doppler signal and the modulated reference beam. Rigorous mathematics formulas have been developed to extract bot amplitude and phase from the measured intensity signal. Software in Matlab has been developed and used to extract such amplitude and phase information from the experimental data. Both amplitude and phase are calculated and the Doppler frequency signature of the object is determined.

11 Claims, 13 Drawing Sheets

INTERFEROMETRIC MILLIMETER WAVE AND THZ WAVE DOPPLER RADAR

STATEMENT OF GOVERNMENT INTEREST

The United States Government has rights in the invention described herein pursuant to Contract No. DE-AC02-06CH11357 between the United States Department of Energy and UChicago Argonne, LLC, as operator of Argonne National Laboratory.

FIELD OF THE INVENTION

The field of the invention generally relates to Doppler radar and more specifically certain implementations relate to interferometric millimeter wave and THz wave Doppler radar.

BACKGROUND OF THE INVENTION

Doppler sensors have become widely used and utilize various frequencies. At microwave frequencies, Doppler sensors are usually realized through the use of quadrature mixers. Microwave based sensors have inherently lower sensitivity (greater than micrometer displacements) than their optical counterparts. High frequency optical Doppler sensor has high sensitivity and lower interference with common consumer electronics. Further, high frequency optical Doppler sensor is more directional and provides for more compact structures. However, high-frequency optical sensors have several drawbacks, such as difficulty with alignment and diffraction loss due to surface roughness. Therefore, optical Doppler sensors are not desirable for applications involving the detection of complex objects. Furthermore, optical wavelengths cannot penetrate through many common materials such as fabrics, plastics and insulation.

As both low frequency microwaves and high frequency optics have advantages and disadvantages, certain systems have attempted to use the intermediate frequency spectrum between the low-frequency microwaves and the high-frequency optics. For example, quadrature mixer based mmW Doppler radar has been recently studied for remote monitoring of vital signs by the authors' group.

SUMMARY OF THE INVENTION

One embodiment relates to a Doppler system for detecting an object. The system comprises a continuous wave source. Further, a beam splitter is provided. The system also includes a phase modulator and an intensity detector.

In another embodiment, a method of detecting an object is provided. A continuous wave beam is emitted. The continuous wave beam is split into an object beam and a reference beam. The object beam is directed to the object. The reference beam is directed to a phase modulator. The phase of the reference beam is modulated to generate a modulated reference beam. An intensity detector receives the modulated reference beam and a reflected Doppler signal from the object.

In another embodiment, a method of processing Doppler information is provided. A Doppler signal is received from an object. A reference signal is modulated. The combined intensity of the Doppler signal and the modulated reference beam is measured. The measured combined intensity is separated into Low-Frequency-Band and High-Frequency-Band signals. The amplitude and phase of the reflected signal from the object are determined. The Doppler frequency signature of the object based upon the determined amplitude and phase is determined.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 10 (top) illustrates measured intensity I(t) for a ball pendulum of small amplitude; and FIG. 10 (bottom) illustrates zoom view of the first 0.5 second.

FIG. 11 (top) illustrates a HFB signal from Eq. (10)

FIG. 14 (top) is measured intensity I(t) for a ball pendulum of large amplitude; and FIG. 14 (bottom) is a zoom view of the first 0.5 second.

DETAILED DESCRIPTION OF THE PREFERRED EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

In one implementation, a universal, mixerless high frequency interferometric Doppler radar is provided. The implementation employs the optical interferometry technique that requires no quadrature mixer. It also differs from other conventional Mach-Zehnder interferometry in that it adopts a continuously oscillating reference mirror to modulate the Doppler signal. By doing this, both amplitude and phase can be extracted from only one intensity measurement In a particular implementation, millimeter wavelengths and THz wavelengths are utilized with optical interferometry technique by using a CW (Continuous Wave) source and an intensity detector. A beam splitter is further utilized and a phase modulator. The detected intensity is the coherent addition of the reference beam and the reflected signal, which, in one implementation, features a fast reference modulation on a slow modulation induced by the object. As further set forth below, rigorous mathematical formulations are provided to solve for both the amplitude and the phase simultaneously. Once the phase is known, Fourier transform is then used to study the Doppler frequency signature of a moving object. Examples are also set forth below a 94 GHz prototype and a 0.15 THz prototype utilized in experimental tests using a ball pendulum target with full-swing distance much smaller than a wavelength to study the performance of the proposed interferometric Doppler radar.

Figure 1:
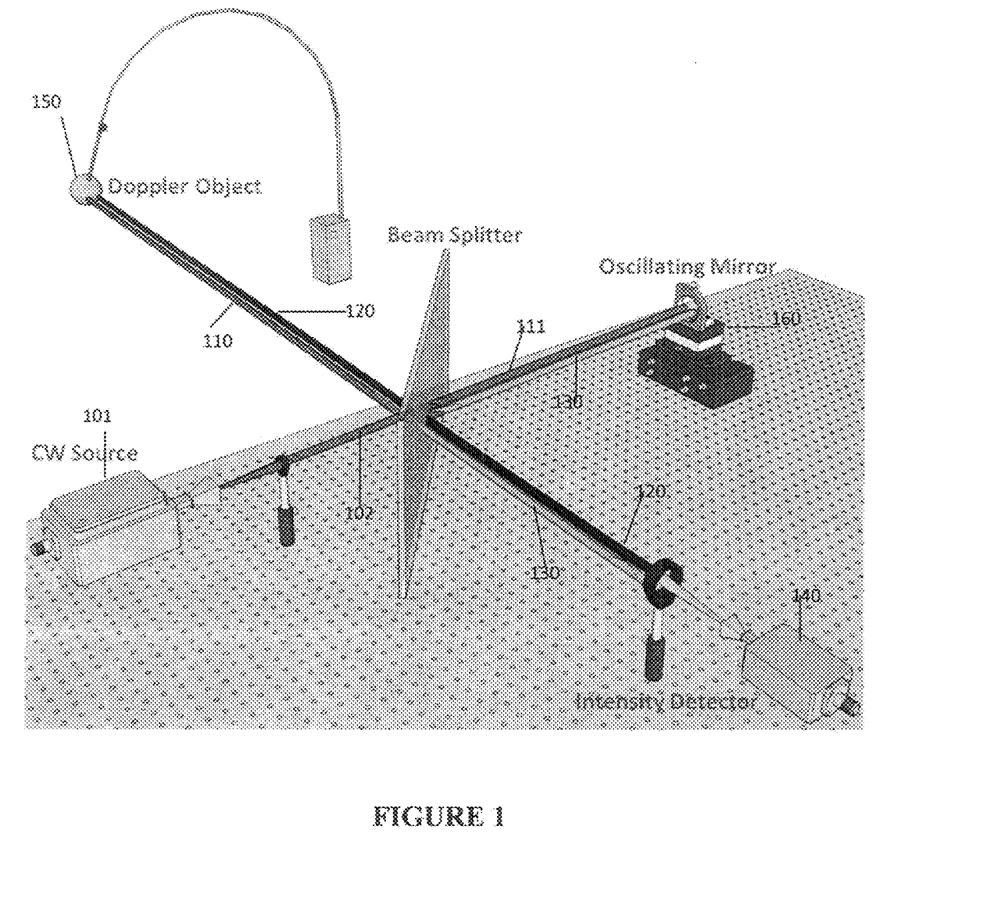
FIG. 1 illustrates schematics of an implementation of an interferometric Doppler radar.

FIG. 1 shows the architecture of one implementation of a Doppler radar, which is based on the Michelson interferometry optical technique using a CW (optionally frequency tunable, e.g., backward wave oscillator and quantum cascade laser etc.) source 101 and an intensity detector 140. The source wave 102 is first collimated into a parallel beam, which is then split into two beams, with one, an object beam 110, propagating towards the moving object and the other, reference beam 111, serving as the reference beam modulated by a phase modulator 160, such as an continuously oscillating mirror or other electronically controlled phase modulators. The reflected Doppler signal 120 by the moving object 150 is then combined with the modulated reference beam 130 and fed into an intensity detector 140. The oscillating mirror 160 modulates the Low-Frequency-Band (LFB) Doppler signature to the High-Frequency-Band (HFB) Doppler centered at the reference arm frequency of the phase modulator.

For broadband Doppler signature, the reference arm frequency needs to oscillate at a frequency that is higher than twice the Doppler frequency of the object to avoid overlapping of the LFB and HFB signals; while for narrowband Doppler signature (e.g., moving cars and aircrafts etc.), the reference arm frequency only needs to >2× the bandwidth of the Doppler signature interferometric Doppler radar relies upon the effect of a phase modulator, operating at $2F_{max}$ to modulate the Doppler spectrum to its HFB and its LFB spectrum. The unknown amplitude and phase are derived from the measured HFB and LFB.

One implementation of the Doppler radar provides a system without the need for mixer based homodyne or heterodyne radar. For implementations utilizing mmW, a mmW Gunn Oscillator may be used. Implementations can also be provided at the THz gap. For example, as THz source either a Backward Wave Oscillator (BWO) or a THz Quantum Cascade Laser (QCL) could replace the mmW Gunn Oscillator and as intensity detector either a pyroelectric detector or a Hot Electron Bolometer (HEB) can be used. The mmW/THz interferometric Doppler radar has many applications, including vibration/displacement measurement (down to few μm), coating/thin film thickness measurement, dielectric constant characterization, phase-sensitive chemicals spectroscopy and phase-contrast Non-Destructive Evaluation (NDE) of dielectric materials.

In one implementation, the phase modulator 160 is a mechanically vibrating mirror, which is different from the stationary steeping Mach-Zehnder type interferometry such as FTIR. In another implementation, the phase modulator is an electronically controllable dielectric material. Examples of such phase modulators 160 include, but are not limited to, Pockel cells, liquid crystal modulators, and the like. Further, it is possible to utilize thermally induced refractive index changes or length changes, such as of an optical fiber or induced length changes by stretching.

Mathematically, the intensity detector detects the combined reflected signal from the object $E_{obj}(t)$ and the reference beam $E_{ref}(t)$, plus the background $E_b$, $$E(t) = E_{obj}(t) + E_{ref}(t) + E_b = a_{obj}(t)e^{j\phi_{obj}(t)} + a_{ref}e^{j\phi_{ref}(t)} + a_b e^{j\phi_b} \quad (1)$$

where $a_{obj}(t)$, $a_{ref}$, and $a_b$ are the amplitudes of the reflected signal, the reference beam and the background respectively; $\phi_{obj}(t)$, $\phi_{ref}(t)$ and $\phi_b$ are their corresponding phases. The detected intensity is thus given by $$I(t)=|E(t)|^2 = a_{obj}^2(t)+a_{ref}^2+a_b^2+2a_{obj}(t)a_b \cos\lfloor\phi_{obj}(t)-\phi_b\rfloor+2a_{ref}a_b \cos\lfloor\phi_{ref}(t)-\phi_b\rfloor+2a_{ref}a_{obj}(t)\cos\lfloor\phi_{ref}(t)-\phi_{obj}(t)\rfloor \quad (2)$$

The intensity signal given in Eq. (2) can be separated into LFB (Low-Frequency-Band) and HFB (High-Frequency-Band) signals. To illustrate this, let us decompose the reference phase $\phi_{ref}(t)$ into Fourier series, $$\phi_{ref}(t) = \phi_0 + \sum_{m=1}^{\infty} c_m \cos(m\omega_{ref}t) \quad (3)$$

Consider the following term given in Eq. (2), $$2a_{ref}a_b\cos[\phi_{ref}(t)-\phi_b] = a_{ref}a_b\left\{e^{j(\phi_{ref}(t)-\phi_b)} + e^{-j(\phi_{ref}(t)-\phi_b)}\right\} \quad (4)$$

$$= a_{ref}a_b\left\{e^{-j\phi_b}e^{j\sum_{m=1}^{\infty}c_m\cos(m\omega_{ref}t)} + e^{j\phi_b}e^{-j\sum_{m=1}^{\infty}c_m\cos(m\omega_{ref}t)}\right\}$$

-continued $$= a_{ref}a_b \left\{ e^{-j\tilde{\phi}_b} \prod_{m=1}^{\infty} \left[ \sum_{n=1}^{\infty} [j^n J_n(c_m)\cos(nm\omega_{ref}t)] \right] + e^{j\tilde{\phi}_k} \prod_{m=1}^{\infty} \left[ \sum_{n=1}^{\infty} [(-j)^n J_n(c_m)\cos(nm\omega_{ref}t)] \right] \right\}$$

where Jacobi-Anger expansion has been used. $J_0$ is Bessel function of the first kind with order 0 and $\tilde{\phi}_b = \phi_b - \phi_0$.

The LFB signal from Eq. (4) is given by $$2a_{ref}a_b\cos[\phi_{ref}(t) - \phi_b]_{LFB} \approx 2a_{ref}a_b\cos(\tilde{\phi}_b)\prod_{m=1}^{\infty} J_0(c_m) \quad (5)$$

Similarly, the following term in Eq. (2) has a LFB signal of $$2a_{ref}a_{obj}(t)\cos[\phi_{ref}(t) - \tilde{\phi}_{obj}(t)]_{LFB} \approx 2a_{ref}a_{obj}(t)\cos(\tilde{\phi}_{obj}(t))\prod_{m=1}^{\infty} J_0(c_m) \quad (6)$$

where $\tilde{\phi}_{obj}(t) = \phi_{obj}(t) - \phi_0$.

Hence the intensity given in Eq. (2) has the LFB signal of $$I(t)|_{LFB} \approx a_{obj}^2(t) + a_{ref}^2 + a_b^2 + 2a_{obj}(t)a_b\cos[\tilde{\phi}_{obj}(t) - \tilde{\phi}_b] + \quad (7)$$
$$2a_{ref}\prod_{m=1}^{\infty} J_0(c_m)\{a_b\cos(\tilde{\phi}_b) + a_{obj}(t)\cos(\tilde{\phi}_{obj}(t))\}$$

The amplitude of the HFB signal of the following term in Eq. (2) is given by $$2a_{ref}a_b\cos[\phi_{ref}(t) - \phi_b]_{HFB} \approx 2a_{ref}a_b\sin(\tilde{\phi}_b)J_1(c_1)\prod_{m=2}^{\infty} J_0(c_m) \quad (8)$$

Similarly, the following term in Eq. (2) has HFB signal amplitude of $$2a_{ref}a_{obj}(t)\cos[\phi_{ref}(t) - \tilde{\phi}_{obj}(t)]_{HFB} \approx \quad (9)$$
$$4a_{ref}a_{obj}(t)\sin(\tilde{\phi}_{obj}(t))J_1(c_1)\prod_{m=2}^{\infty} J_0(c_m)$$

Hence the intensity given in Eq. (2) has the HFB signal of $$I(t)|_{HFB} \approx 4a_{ref}J_1(c_1)\prod_{m=2}^{\infty} J_0(c_m)\{a_{obj}(t)\sin(\tilde{\phi}_{obj}(t)) + a_b\sin(\tilde{\phi}_b)\} \quad (10)$$

The LFB and HFB signals when there is no background is obtained from Eq. (7) and Eq. (10)

$$I(t)|_{LFB} \approx a_{obj}^2(t) + a_{ref}^2 + 2a_{ref}\prod_{m=1}^{\infty} J_0(c_m)a_{obj}(t)\cos(\tilde{\phi}_{obj}(t)) \quad (11)$$

$$I(t)|_{HFB} \approx 4a_{ref}J_1(c_1)\prod_{m=1}^{\infty} J_0(c_m)a_{obj}(t)\sin(\tilde{\phi}_{obj}(t))$$

The amplitude and phase of the Doppler signal of the moving object can be solved from the LFB signal in Eq. (7) and HFB signal in Eq. (10), $$x_c(t)^2 + Bx_c(t) + C = I(t)|_{LFB} \quad (12)$$

where we have the following definitions:

$$x_c(t) \equiv a_{obj}(t)\cos(\tilde{\phi}_{obj}(t)) \quad (13)$$

$$B = 2a_b\cos(\tilde{\phi}_b) + 2a_{ref}\prod_{m=1}^{\infty} J_0(c_m)$$

$$C = x_s(t)^2 + a_{ref}^2 + a_b^2 + 2a_b\sin(\tilde{\phi}_b)x_s(t) + 2a_{ref}a_b\cos(\tilde{\phi}_b)\prod_{m=1}^{\infty} J_0(c_m) - I(t)|_{LFB}$$

$$x_s(t) \equiv a_{obj}(t)\sin(\tilde{\phi}_{obj}(t)) = \left[I(t)|_{HFB}/4a_{ref}J_1(c_1)\prod_{m=2}^{\infty} J_0(c_m)\right] - a_b\sin(\tilde{\phi}_b)$$

Where $c_m$ is the reference mirror oscillating amplitudes at mth harmonics frequency; $a_{obj}$ and $a_{ref}$ are the object and reference mirror amplitudes respectively; I(t) is the measured intensity signal; and J0, J1 are the Bessel functions of zero/first order respectively. The variable $x_c(t)$ can be solved from Eq. (1), $$x_c(t) = \frac{-B \pm \sqrt{B^2 - 4C}}{2} \quad (14)$$

Combining Eq. (1) and Eq. (2), we obtain the amplitude and phase $$a_{obj}(t) = \sqrt{x_c(t)^2 + x_s(t)^2}; \quad \tilde{\phi}_{obj}(t) = \arctan[x_s(t)/x_c(t)] \quad (15)$$

Alternatively, if one wants to calculate only the phase $\tilde{\phi}_{obj}(t)$, a simpler formula can be used:

$$\tilde{\phi}_{obj}(t) = \arctan\left[-\frac{J_2(c_1)I(t)|_{HFB}}{J_1(c_1)I(t)|_{HFB2}}\right] \quad (16)$$

With $J_2$ being the Bessel function of order 2, and $I(t)|_{HFB}$ and $I(t)|_{HFB2}$ are first HFB and second HFB signals centered at first harmonics reference frequency and second harmonics reference frequency respectively.

When background is absent, the coefficients in Eq. (13) are given by, $$B = 2a_{ref} \prod_{m=1}^{\infty} J_0(c_m) \quad (17)$$

$$C = x_s(t)^2 + a_{ref}^2 - I(t)|_{LFB} x_s(t)$$
$$\equiv a_{obj}(t)\sin(\tilde{\phi}_{obj}(t))$$
$$= I(t)|_{HFB} / 4a_{ref} J_1(c_1) \prod_{m=2}^{\infty} J_0(c_m)$$

After obtaining the reflected sub-THz signal complex field (amplitude and phase), the Doppler frequency signature of the moving object can be analyzed. The Doppler frequency $f_{Doppler}(t)$ from the carrier frequency f is given by $$f_{Doppler}(t) = 2\frac{v(t)}{c}f \quad (18)$$

where v(t) is the object velocity and c is the speed of light. The Doppler frequency is closely related to the phase $\phi_{obj}(t)$ of the reflected signal for the object displacement x(t), $$f_{Doppler}(t) = \frac{d\phi_{obj}(t)}{dt} = \frac{4\pi}{\lambda}\frac{dx(t)}{dt} \quad (19)$$

where $\lambda$ is the carrier wavelength. Eq. (19) has taken into account the round trip of the carrier wave.

Numerical Simulation

Figure 2:
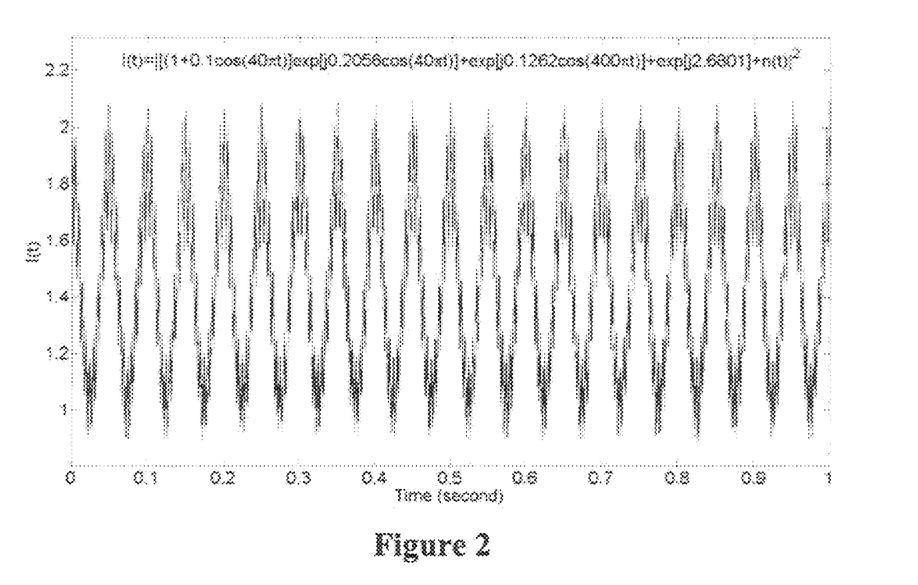
FIG. 2 illustrates simulated 94-GHz intensity I(t).
Figure 3:
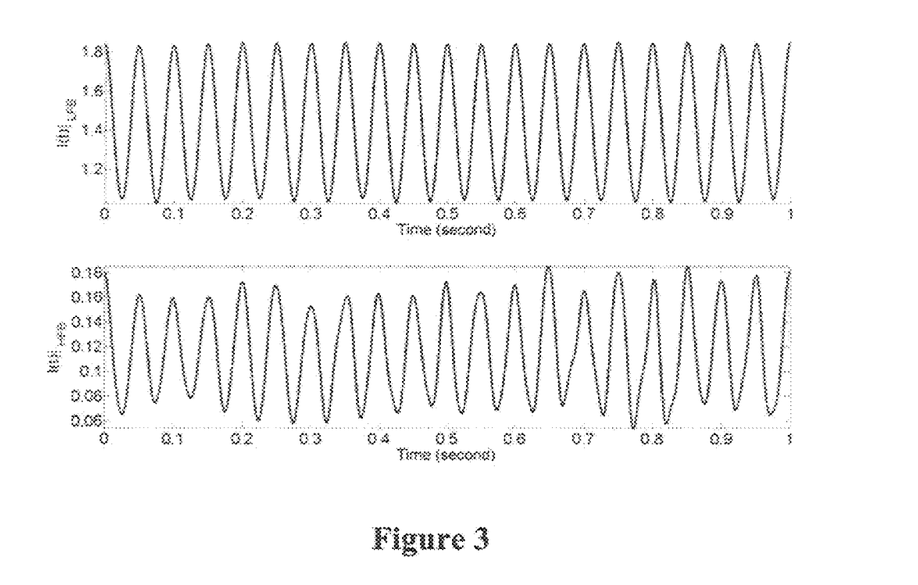
FIG. 3 illustrates LFB (Low Frequency Band) and HFB (High Frequency Band) signals of I(t) in FIG. 2.
Figure 4:
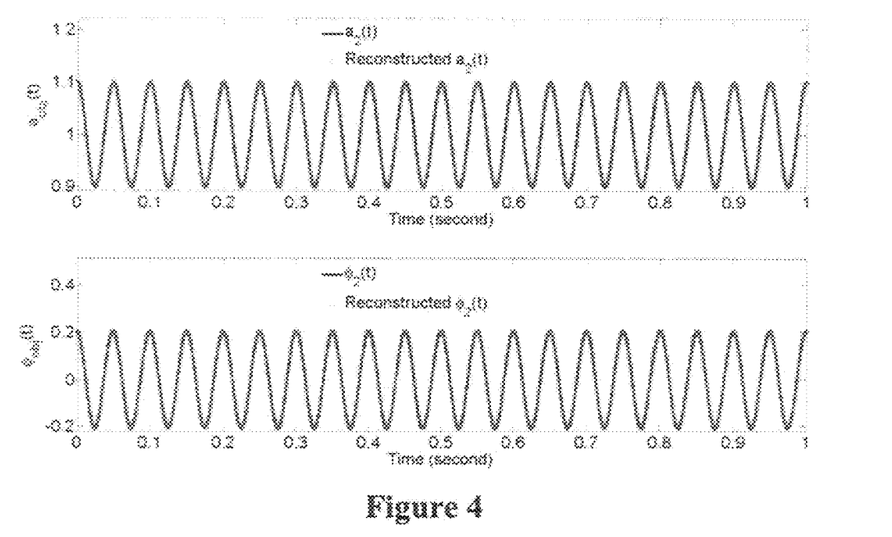
FIG. 4 illustrates amplitude $a_{obj}(t)$ and phase $\phi_{obj}(t)$ obtained from LFB and HFB signals in FIG. 3: comparisons between reconstructed values and initial values in Eq. (20).

Before the experiment, a numerical simulation was performed to confirm the mathematical derivation given above. The following parameters are used for numerical simulation:

$$E(t) = [1 + 0.1 \cos(40\pi t)/]e^{j0.2056 \cos(40\pi t)} + e^{j0.1262 \cos(400\pi t)} + e^{j2.6801} + n(t) \quad (20)$$

where n(t) is the added noise so that the SNR is 10 dB during the simulation. The intensity I(t) plot is shown in FIG. 2. The calculated LFB and HFB signals are shown in FIG. 3. The reconstructed amplitude $a_{obj}(t)$ and phase $\phi_{obj}(t)$ are shown as circles in FIG. 4, with great agreements with the initial values (lines) in Eq. (20).

Example 1

To test the performance of the proposed interferometric Doppler radar, a 94 GHz prototype was built using a Gunn oscillator as source 101 and a Schottky Barrier (SB) diode as intensity detector 140. The phase modulator 160 was a reference mirror is oscillating at a frequency of 200 Hz with displacement amplitude of $A_{mirror} \approx 0.03$ mm, which is much smaller than the wavelength of $\lambda \approx 3.2$ mm. This corresponds to the following parameters in Eq. (4): $c_1 = 4\pi A_{mirror}/\lambda \approx 0.1181$, $J_1(c_1) \approx 0.0588$, $J_1(c_m) \approx 0$, m=2, 3, 4 . . . ; $c_m \approx 0$, $J_0(c_m) \approx 1$, m=1, 2, 3 . . . . During the experiment, a swinging ball pendulum with length L≈15 cm was used as the moving object, giving a swing frequency of $$f_{pendulum} \approx \frac{1}{2\pi}\sqrt{\frac{g}{L}} = \frac{1}{2\pi}\sqrt{\frac{9.8}{L}} \approx 1.286 \text{ Hz}.$$

The full swing distance of the pendulum was set to $D_{pendulum} = 0.25$ mm, much smaller than the carrier wavelength of $\lambda \approx 3.2$ mm.

Figure 5:
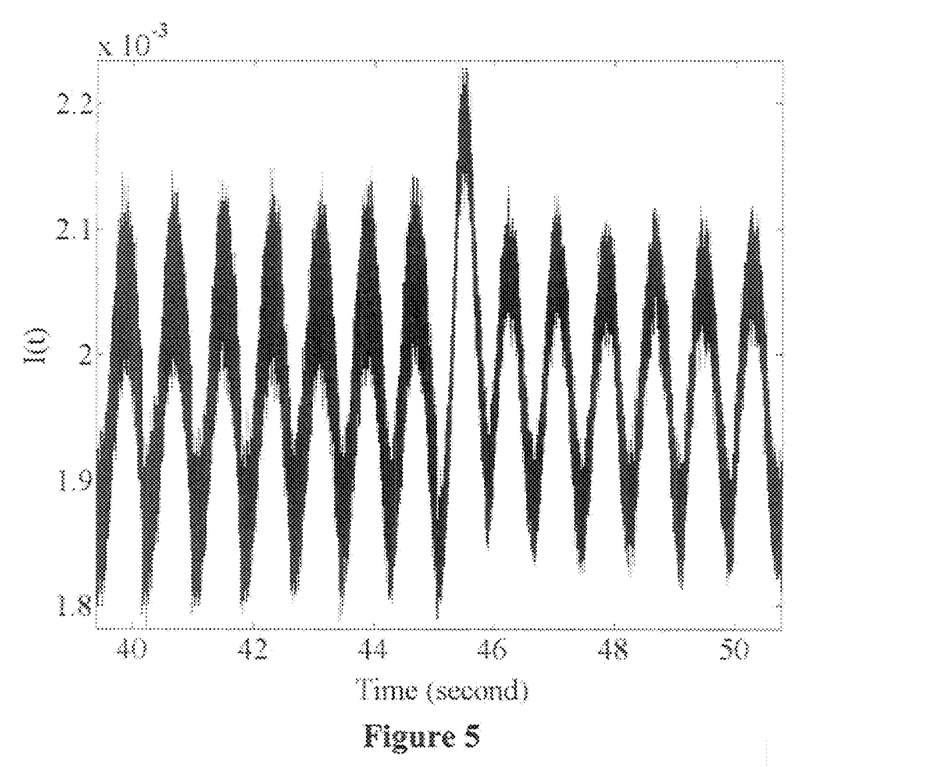
FIG. 5 is a graph of measured 94-GHz intensity I(t) for a ball pendulum of small amplitude.
Figure 6:
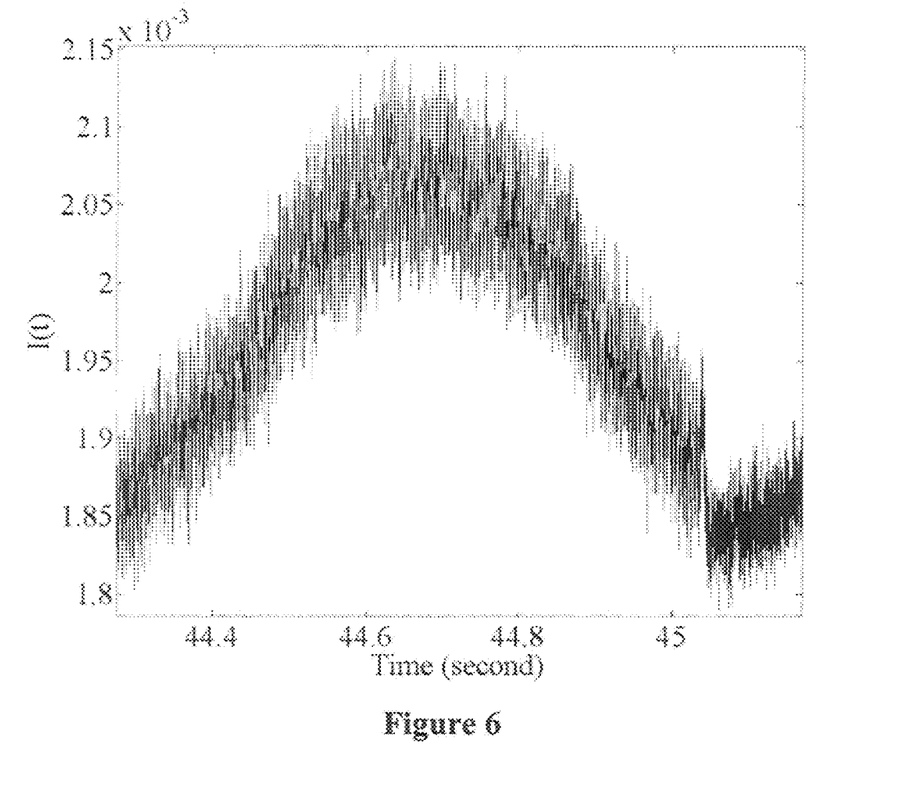
FIG. 6 is a zoom view of a small segment of I(t) in FIG. 5 to show the 200 Hz modulation of one single cycle for approximately t<45 seconds.

A sample segment of the measured intensity I(t) is shown in FIG. 5. The signal before approximately 45 s was collected with the reference mirror oscillating at 200 Hz. The reference mirror is kept stationary after approximately 45 s. FIG. 6 shows the close up of a small segment of the measured intensity I(t) shown in FIG. 5. The 200 Hz modulation is evident before approximately 45 s with no modulation when the reference mirror ceased to oscillate after approximately 45 s.

Figure 7:
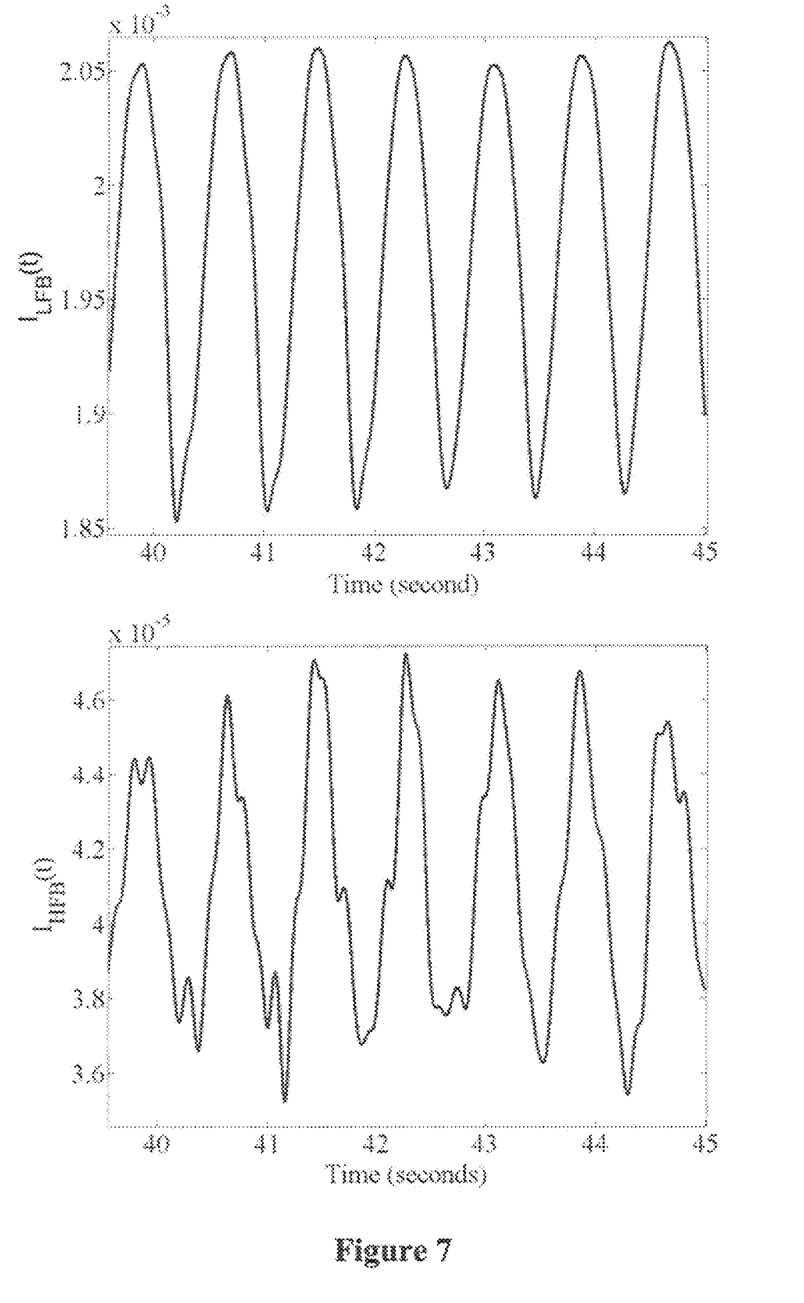
FIG. 7 (top) illustrates LFB signal from Eq. (7), and FIG. 7 (bottom) illustrates HFB signal from Eq. (10).
Figure 8:
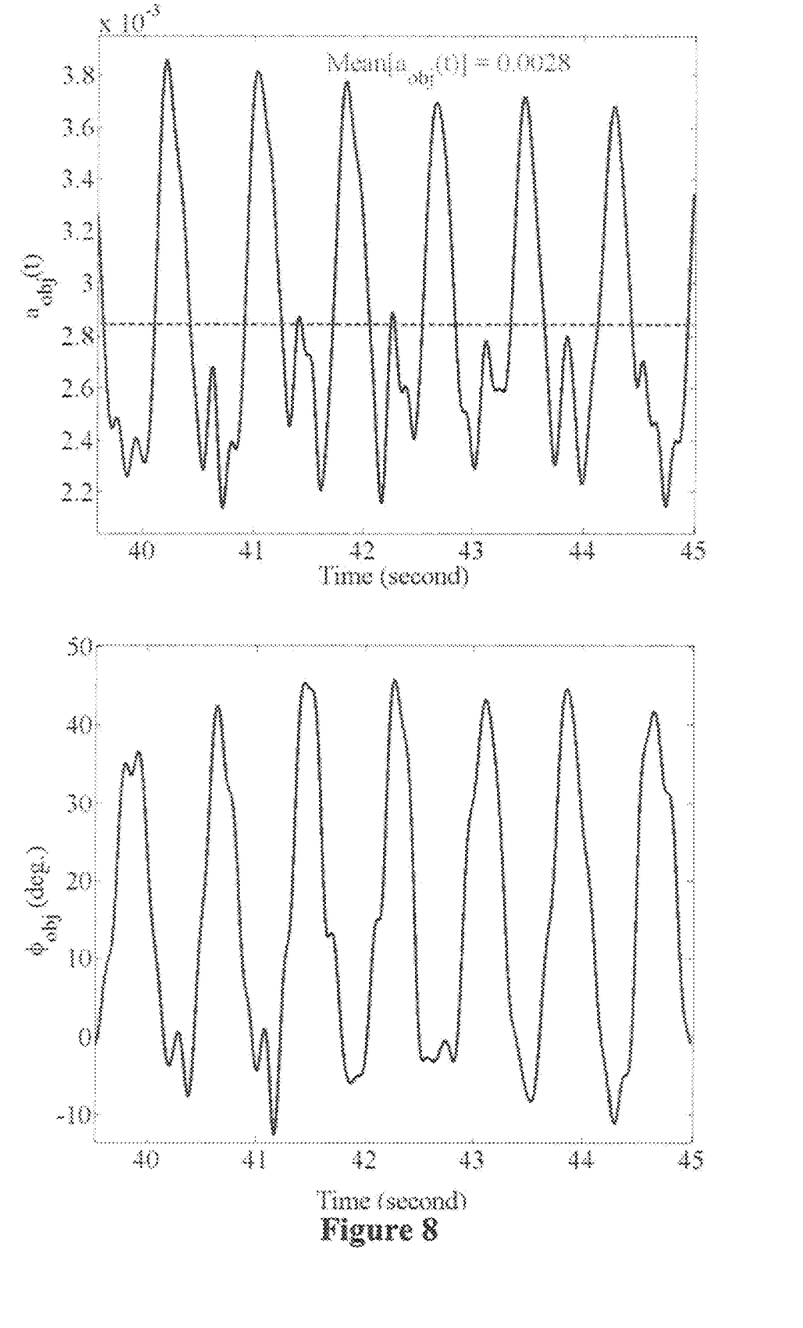
FIG. 8 (top) illustrates amplitude $a_{obj}(t)$, and FIG. 8 (bottom) illustrates phase $\phi_{obj}(t)$.
Figure 9:
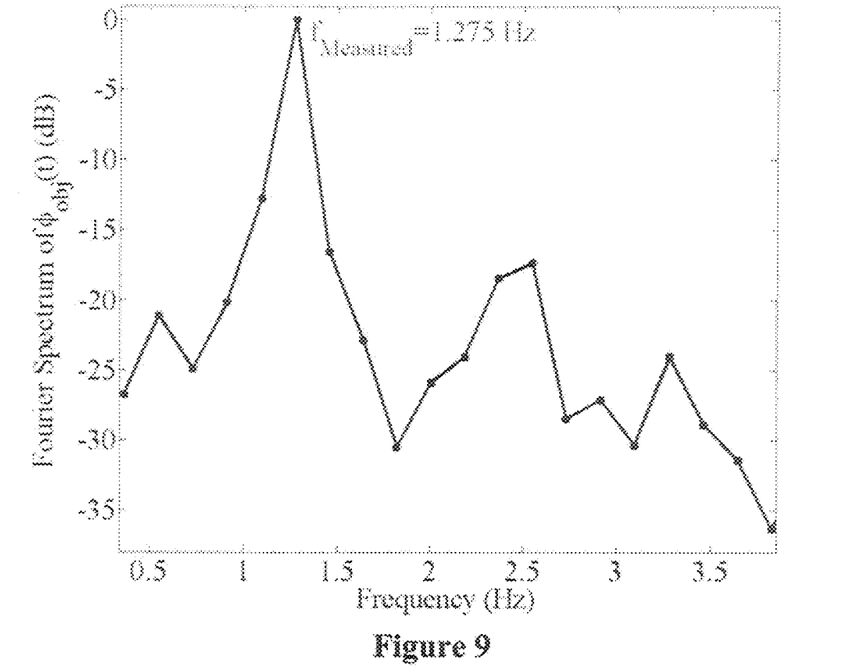
FIG. 9 illustrates Doppler signature: Fourier transform of $\phi_{obj}(t)$ given in FIG. 8.

The LFB signal given in Eq. (7) and HFB signal given in Eq. (10) are shown in FIG. 7 (top) and FIG. 7 (bottom) respectively. With LFB and HFB signals now available, the amplitude and phase can be obtained by solving Eq. (12) to Eq. (15) with the results shown in FIGS. 8a-b. The displacement amplitude of the object $a_{obj}(t)$ is shown in FIG. 8 (top), which has a mean value of $\bar{a}_{obj}(t) = 0.0028$. FIG. 8 (bottom) shows the displacement phase of the object $\phi_{obj}(t)$. The full-swing phase, i.e., difference between phase maximum $\phi_{obj}(t)|_{max}$ and phase minimum $\phi_{obj}(t)|_{min}$, is ≈58°, which corresponds to a full-swing distance of $D_{measured} \approx 0.2571$ mm, agreeing well with the experimentally set swing value of $D_{pendulum} = 0.25$ mm. The Doppler frequency signature can be obtained by taking the Fourier transform of $\phi_{obj}(t)$ given in FIG. 8 (bottom). The result of the transformation is shown in FIG. 9. The measured pendulum frequency is $f_{measured} \approx 1.275$ Hz, agreeing well with the theoretically calculated value of $f_{pendulum} \approx 1.286$ Hz. Finally, the sensitivity of the 94-GHz prototype was determined to be ~5 degrees, which corresponding to ~45 μm displacement accuracy.

This example utilized a universal, mixerless interferometric Doppler radar architecture employing a CW source and an intensity detector. A motorized oscillating reference mirror was used to modulate the intensity at a frequency higher than twice the object's Doppler frequency. The 94-GHz prototype was built and tested using a ball pendulum target with a full-swing distance much smaller than the carrier wavelength. The mathematical formulation set forth above was derived to extract both the amplitude and the phase of the Doppler signal by decomposing the measured intensity into LFB and HFB signals. The measurement results were shown to agree well with the experimentally adjusted parameters such as pendulum frequency and full-swing distance.

Experiment 2

To further test the performance of the proposed interferometric Doppler radar, a 0.15-THz prototype was built using Gunn oscillator as a source 101 and Schottky Barrier (SB) diode as an intensity detector 140. The phase modulator 160 was a reference mirror oscillating at a frequency of 190 Hz with amplitude of $A_{mirror} \approx 0.0388$ mm, much smaller than the wavelength of $\lambda = 2$ mm. This corresponds to the following parameters in Eq. (4): $c_1 = 4\pi A_{mirror}/\lambda \approx 0.1218$, $J_1(c_1) \approx 0.0608$, $J_1(c_m) \approx 0$, m=2, 3, 4 . . . ; $c_m \approx 0$, $J_0(c_m) \approx 1$, m=1, 2, 3, . . . . During the experiment, a swinging ball pendulum with length L≈18 cm is used as the Doppler object, giving a swing frequency of $$f_{pendulum} \approx \frac{1}{2\pi}\sqrt{\frac{g}{L}} \approx 1.17 \text{ Hz}.$$

The full swing distance of the swinging pendulum was set to a value much smaller than the carrier wavelength of $\lambda=2$ mm.

Figure 10:
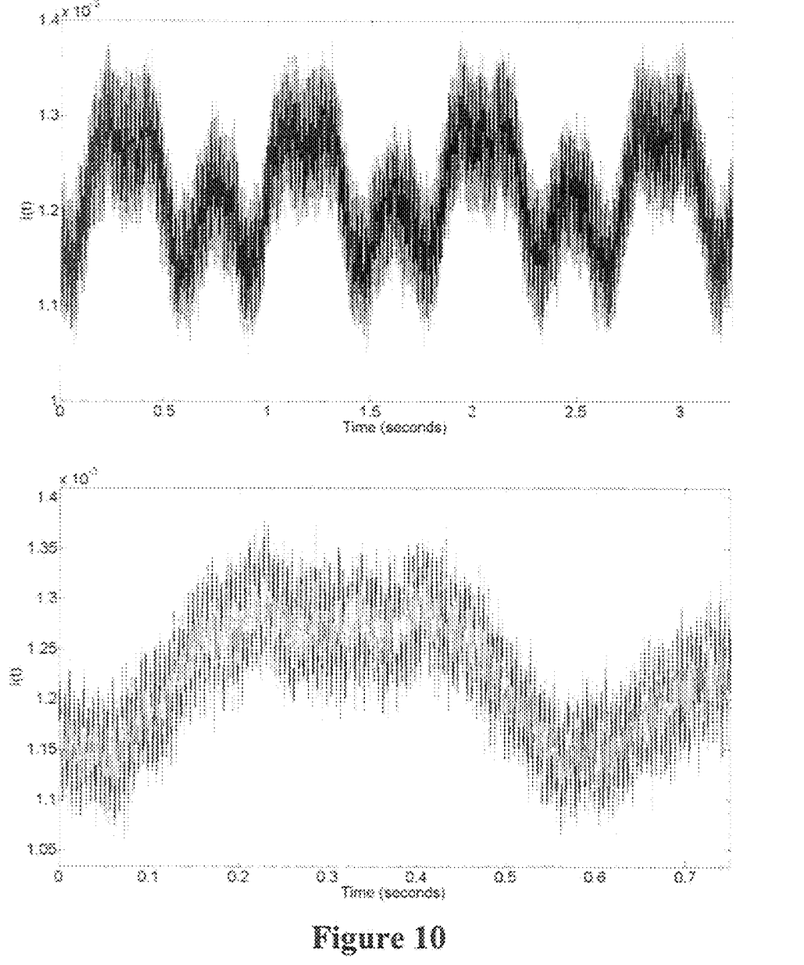

Experimental results are provided for two typical cases: 1) phase change smaller than $2\pi$; and 2) phase change larger than $2\pi$. In the case of phase change smaller than $2\pi$, the full swing distance of the swinging pendulum was set to $D_{pendulum}=0.95$ mm. The measured intensity $I(t)$ is shown in top plot of FIG. 10 (top) and the zoom view of the first 0.5 second is shown in the bottom plot of FIG. 10 (bottom). The LFB signal given in Eq. (7) and HFB signal given in Eq. (10) are shown in top and bottom plots of FIG. 11 (top) and FIG. 11 (bottom) respectively.

Figure 11:
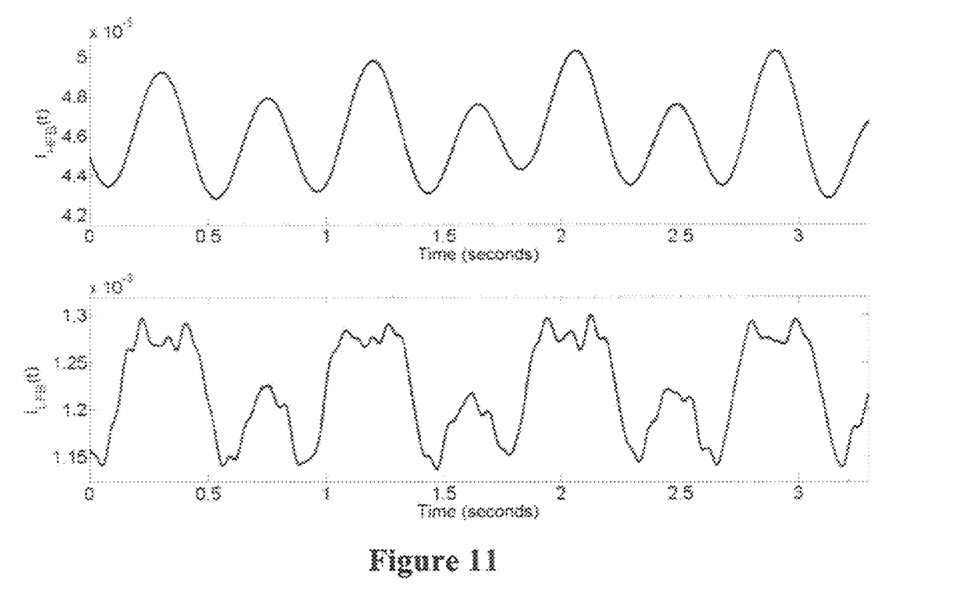
FIG. 11 (bottom) illustrates a LFB signal from Eq. (7).
Figure 12:
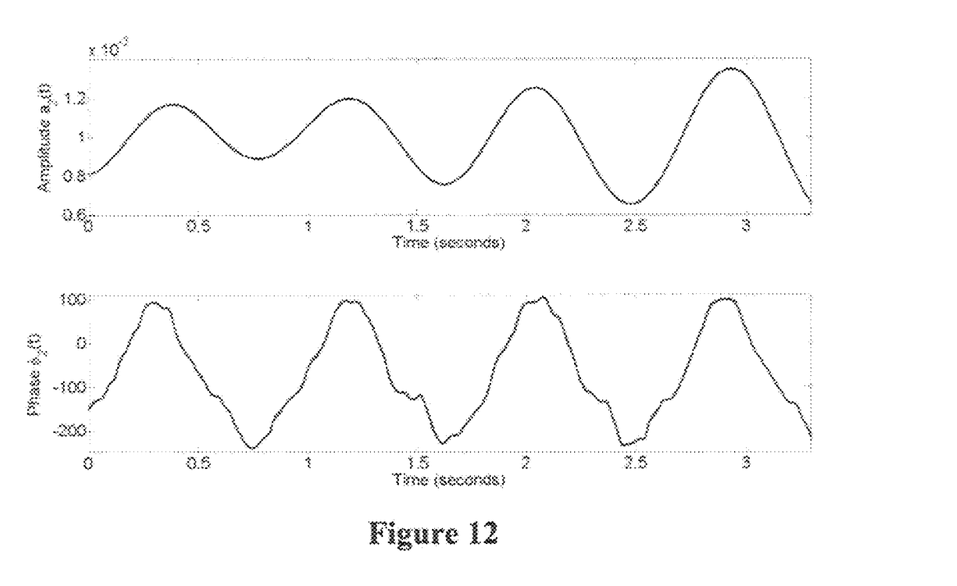
FIG. 12 (top) illustrates amplitude $a_{obj}(t)$ and FIG. 12 (bottom) phase $\phi_{obj}(t)$.
Figure 13:
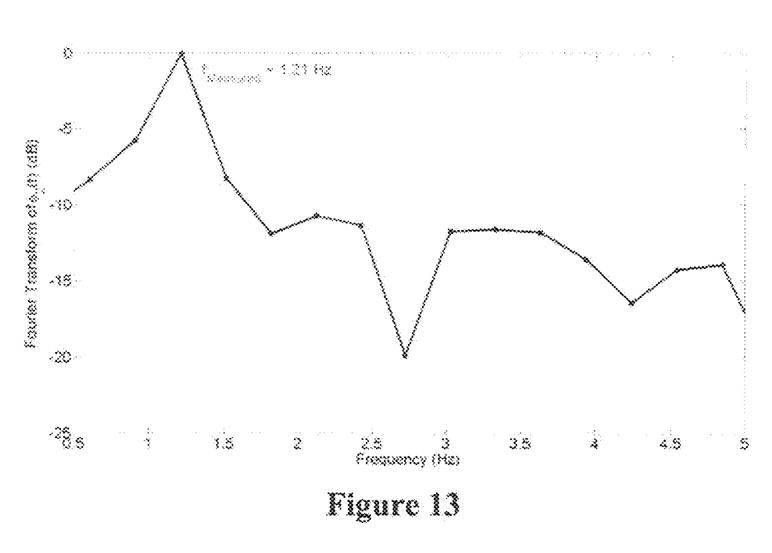
FIG. 13 illustrates a frequency signature obtained through Fourier transform of $\phi_{obj}(t)$ given in FIG. 12.

With LFB and HFB signals obtained in FIGS. 11a-b, both amplitude and phase can be obtained by solving Eq. (12) to Eq. (14); FIG. 12 shows the obtained amplitude $a_{obj}(t)$ and the phase $\phi_{obj}(t)$ of the object. The full-swing phase, i.e., difference between phase maximum $\phi_{obj}(t)|_{max}$ and phase minimum $\phi_{obj}(t)|_{min}$, is obtained as $\approx 344°$, which corresponds to a full-swing distance of $D_{measured} \approx 0.96$ mm, agreeing well with the experimentally set value of $D_{pendulum}=0.95$ mm. Doppler frequency signature can be obtained through Fourier transform of $\phi_{obj}(t)$ given in FIG. 13, which is shown in FIG. 12. The obtained pendulum frequency is $f_{measured} \approx 1.21$ Hz, agreeing well with the aforementioned theoretical calculated value of $f_{pendulum} \approx 1.17$ Hz.

Figure 14:
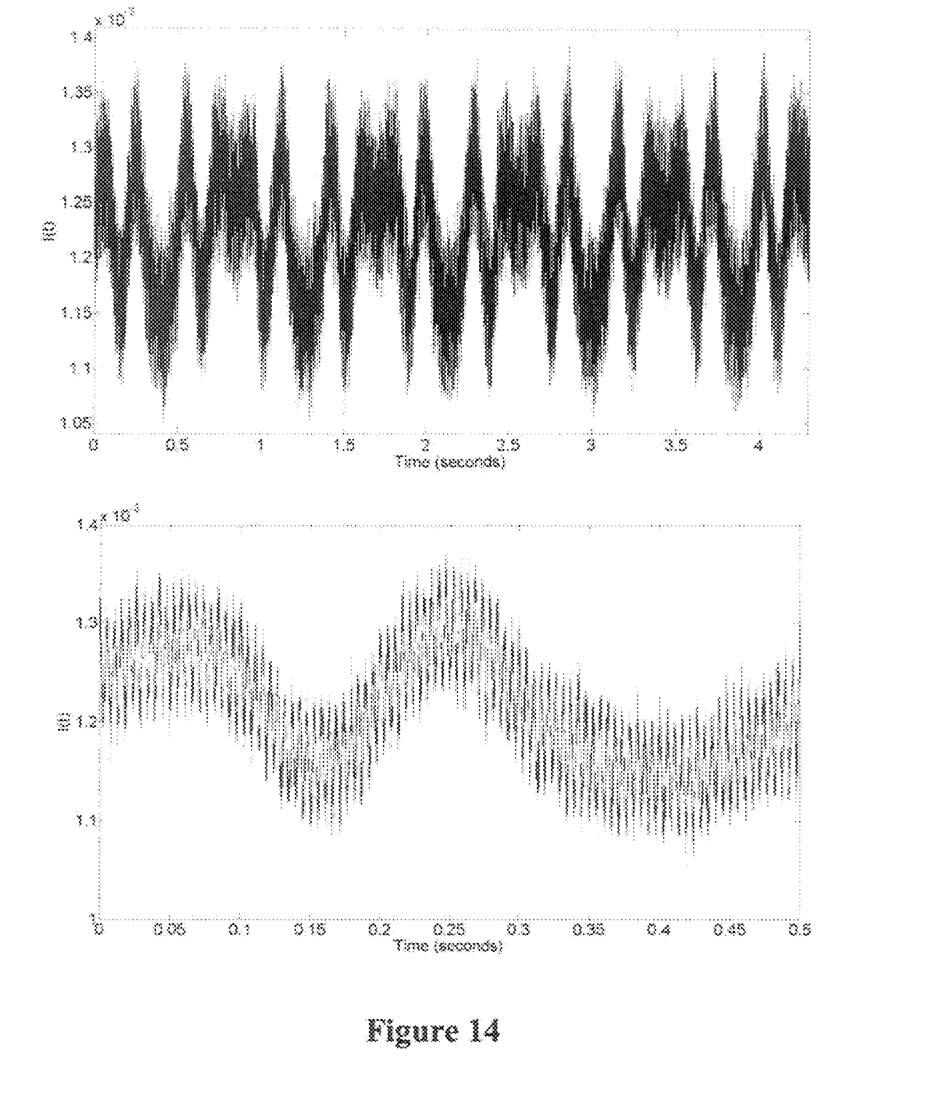

In the case of phase change larger than $2\pi$, the full swing distance of the swinging pendulum was set to $D_{pendulum}=1.85$ mm. The measured intensity $I(t)$ is shown in top plot of FIG. 14 (top) and the zoom view of the first 0.5 seconds is shown in the bottom plot of FIG. 14 (bottom). The LFB signal given in Eq. (7) and HFB signal given in Eq. (10) are shown in top and bottom plots of FIG. 15a (top) and FIG. 15 (bottom) respectively.

Figure 15:
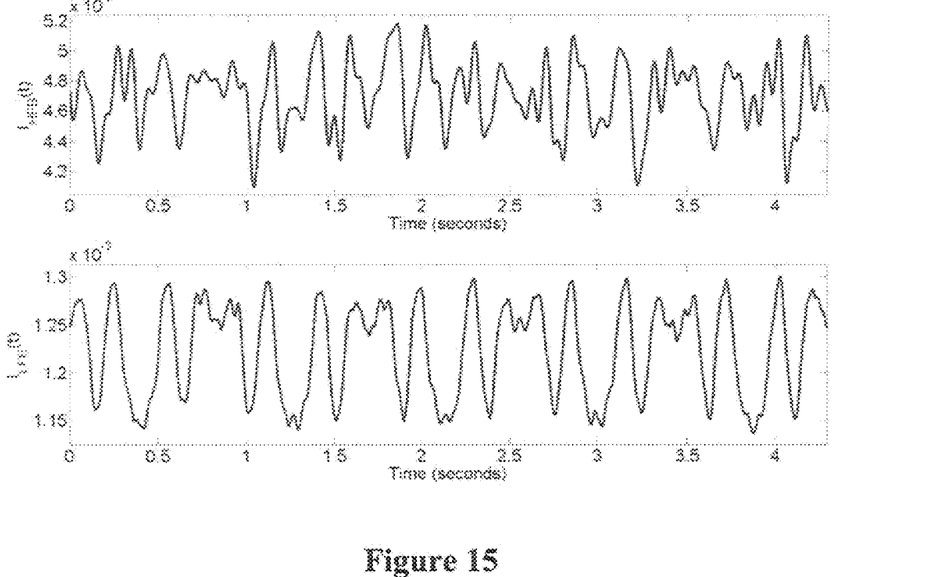
FIG. 15 (top) HFB signal from Eq. (10), and FIG. 15 (bottom) is a LFB signal from Eq. (7).
Figure 16:
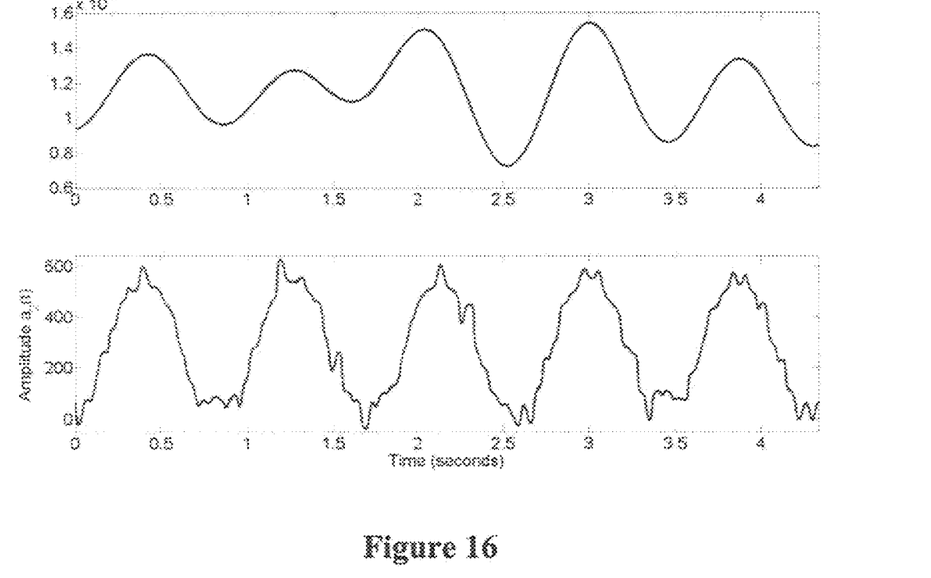
FIG. 16 (top) illustrates amplitude $a_{obj}(t)$, and FIG. 16 (bottom) illustrates phase $\phi_{obj}(t)$.
Figure 17:
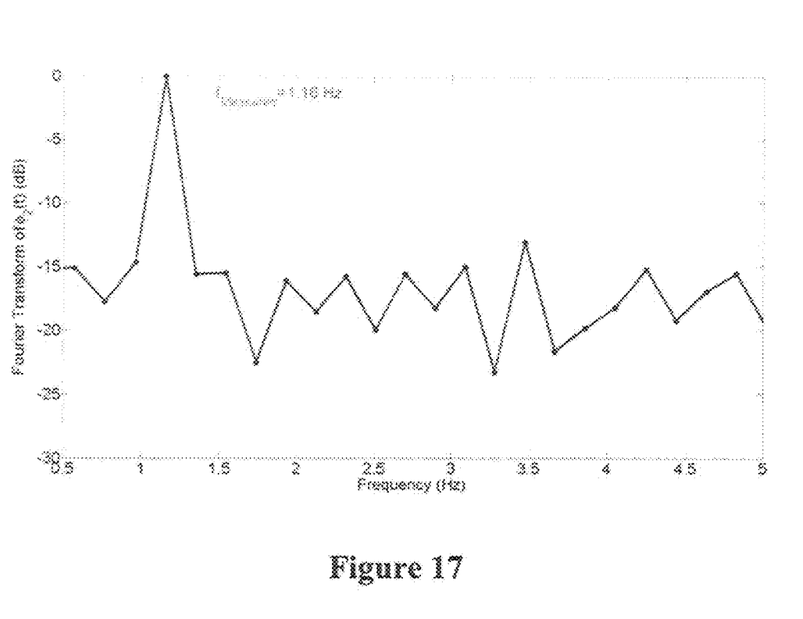
FIG. 17 Frequency signature obtained through Fourier transform of $\phi_{obj}(t)$ given in FIG. 16.

With LFB and HFB signals obtained in FIG. 15, both amplitude and unwrapped phase can be obtained by solving Eq. (12) to Eq. (14); FIG. 16 shows the obtained amplitude $a_{obj}(t)$ and the phase $\phi_{obj}(t)$ of the object. The full-swing phase, i.e., difference between phase maximum $\phi_{obj}(t)|_{max}$ and phase minimum $\phi_{obj}|_{min}$, is obtained as $\approx 666°$, which corresponds to a full-swing distance of $D_{measured} \approx 1.8503$ mm, agreeing well with the experimentally set value of $D_{pendulum} \approx 1.85$ mm. Doppler frequency signature can be obtained through Fourier transform of $\phi_{obj}(t)$ given in FIG. 17, which is shown in FIG. 16. The obtained pendulum frequency is $f_{measured} \approx 1.16$ Hz, compared with the theoretical calculated value of $f_{pendulum} \approx 1.17$ Hz.

This example reflects a mixer less interferometric 0.15-THz Doppler radar. The sub-THz Doppler radar architecture consisted of just a CW source and a Shottky diode intensity detector. A motorized oscillating reference mirror was used to modulate the intensity at a frequency higher than twice the object's Doppler frequency. The mathematical formulation above were used to extract both the amplitude and the unambiguous unwrapped phase of the Doppler signal by decomposing the measured intensity into LFB and HFB signals.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A Doppler system for detecting an object, comprising:
a continuous millimeter or terahertz wave source;
a millimeter or terahertz wave beam splitter positioned to receive a continuous millimeter or terahertz wave beam from the continuous millimeter or terahertz wave source and split the beam into an object beam directed to the object and a reference beam directed to a smooth phase modulator;
the smooth phase modulator with modulation frequency larger than twice the Doppler frequency of the object;
the reference beam having a Low-Frequency-Band (LFB) Doppler signature modulated to a High-Frequency-Band (HFB) Doppler centered at a reference frequency of the smooth phase modulator;
a reflected signal from the object having a determined amplitude and phase; and
a millimeter or terahertz wave intensity detector positioned to receive the modulated reference beam and the reflected signal;
wherein the Doppler frequency signature of the object is determined based upon the determined amplitude and phase and each higher-order harmonic High-Frequency-Bands (HFBs) of the reference frequency is recognized.

2. The system of claim 1, wherein the millimeter or terahertz wave beam splitter is further positioned to receive a phase modulated reference beam from the smooth phase modulator and a reflected Doppler signal from the object.

3. The system of claim 1, wherein the continuous millimeter or terahertz wave source is configured to provide a parallel continuous wave beam.

4. The system of claim 1, wherein the smooth phase modulator is a mechanically oscillating mirror.

5. The system of claim 4, wherein the smooth phase modulator is selected from the group consisting of mechanically oscillating and electronically controlled.

6. The system of claim 1, wherein the continuous wave source is configured to emit frequencies between 0.085 THz and 0.3 THz.

7. A method of detecting an object comprising;
emitting a continuous millimeter or terahertz wave beam;
splitting the continuous millimeter or terahertz wave beam into an object beam and a reference beam;
directing the object beam to the object;
directing the reference beam to a mechanically vibrating or electronically controlled smooth phase modulator;
modulating the phase of the reference beam to generate a modulated reference beam by modulating a reference beam Low-Frequency-Band (LFB) Doppler signature to a High-Frequency-Band (HFB) Doppler centered at a reference frequency of the phase modulator; and
receiving at a continuous millimeter or terahertz intensity detector the modulated reference beam and a reflected Doppler signal from the object;
determining the amplitude and phase of the reflected signal from the object; and
determining the Doppler frequency signature of the object based upon the determined amplitude and phase;
wherein the reference frequency is at least twice the Doppler frequency of the object and further comprising recognizing each higher-order harmonic High-Frequency-Bands (HFBs) of the reference frequency.

8. The method of claim 7, wherein the continuous millimeter or terahertz wave beam is collimated into a parallel continuous wave beam prior to being split.

9. A method of processing Doppler information comprising:
- modulating a reference signal by modulating a reference beam Low-Frequency-Band (LFB) Doppler signature to the High-Frequency-Band (HFB) Doppler centered at a reference frequency of a phase modulator;
- receiving, at an intensity detector, a Doppler signal from an object and the modulated reference signal;
- measuring the combined intensity of the Doppler signal and the modulated reference beam;
- separating the measured combined intensity into Low-Frequency-Band and High-Frequency-Band signals;
- determining the amplitude and phase of the reflected signal from the object;
- determining the Doppler frequency signature of the object based upon the determined amplitude and phase;
- wherein the reference signal has a frequency at least twice that of the Doppler signal the object and further comprising recognizing each higher-order harmonic High-Frequency-Bands (HFBs) of the reference signal.

10. The method of claim 9, the amplitude and phase of the are extracted from one single interference intensity signal:

$$a_{obj}(t) = \sqrt{x_c(t)^2 + x_s(t)^2} \; ;$$

$$\tilde{\phi}_{obj}(t) = \arctan[x_s(t)/x_c(t)]x_c(t)^2 + Bx_c(t) + C = I(t)|_{LFB}$$

$$B = 2a_b \cos(\tilde{\phi}_b) + 2a_{ref} \prod_{m=1}^{\infty} J_0(c_m)$$

$$C = x_s(t)^2 + a_{ref}^2 + a_b^2 + 2a_b \sin(\tilde{\phi}_b)x_s(t) + 2a_{ref}a_b\cos(\tilde{\phi}_b)\prod_{m=1}^{\infty} J_0(c_m) - I(t)\Big|_{LFB}$$

11. The method of claim 10, wherein determining the Doppler frequency signature comprises:
i) perform time derivative of the obtained phase;
or ii) perform time derivative of the following phase:

$$\tilde{\phi}_{obj}(t) = \arctan\left[-\frac{J_2(c_1)I(t)|_{HFB}}{J_1(c_1)I(t)|_{HFB2}}\right].$$

* * * * *